April 23, 1940.　　J. J. M. L. MARCHAND　　2,198,440
BUNDLE TYING MACHINE
Filed Jan. 22, 1938　　9 Sheets-Sheet 1

INVENTOR
Jean Joseph Martin Lambert Marchand
BY
Pennie Davis Marvin & Edmonds
ATTORNEYS

April 23, 1940.   J. J. M. L. MARCHAND   2,198,440
BUNDLE TYING MACHINE
Filed Jan. 22, 1938      9 Sheets-Sheet 7

Inventor
Jean Joseph Martin Lambert Marchand
By
Attorney

April 23, 1940.   J. J. M. L. MARCHAND   2,198,440
BUNDLE TYING MACHINE
Filed Jan. 22, 1938   9 Sheets-Sheet 9

Fig. 12.

Inventor
Jean Joseph Martin Lambert Marchand

By
Attorney

Patented Apr. 23, 1940

2,198,440

UNITED STATES PATENT OFFICE 2,198,440

BUNDLE TYING MACHINE

Jean Joseph Martin Lambert Marchand, The Hague, Netherlands, assignor to N. V. Transorma Bundel-Sluit-Machine "B. S. M.", The Hague, Netherlands, a corporation of the Netherlands Application January 22, 1938, Serial No. 186,283
In the Netherlands February 22, 1937

9 Claims. (Cl. 100—31)

This invention relates to an improved machine for tying a bundle of letters, books or like documents or for binding with a string one or more other objects.

The tying of bundles of letters, printed matter, postal documents, books, brochures, periodicals, newspapers, clearing notes, bank notes, cheques and like documents, as well as packets, boxes, and the like, in practice presents many difficulties when it is done by hand, which method still is in rather common use, and particularly when the bundles are comparatively high and heavy and difficult to manipulate. Said tying by hand takes a considerable time, and usually a large quantity of string or the like is consumed. Furthermore bundles tied by hand seldom are of sufficiently compact and above all a thorough bundling depends on the efficiency of the operator. A compact and close tying is, however, of the greatest importance because bundles not so tied are apt accidentally to become untied with the consequence that the components are separated and do not stay in good order, thus necessitating re-arrangement thereof before retying.

Therefore, various efforts already have been made to effect the tying mechanically in machines. In some of these machines the ends of the string which is wrapped around the bundle are mechanically knotted together; this has, however, the disadvantage that the connecting knot is not sufficiently tight and can easily be undone. Indeed the string or other tying medium therefor sometimes is wound more than once around the bundle, this double tying however not only takes longer but also consumes more string, so that this method is not economical. In other machines, the ends of the string after the wrapping are laid together in such overlapping position that they can be connected by means of a metal clip; although the connection itself will be more tight, the construction of these machines and their operation are, as a whole, far too complicated for the purpose in view. In fact, it is because none of the existing bundle tying machines and their operation are satisfactory for efficient mechanical tying that tying by hand still is generally practiced. Said conditions are, briefly recapitulated, the following:

The machine should be capable of tying components and bundles of very different form and dimensions and the tying of small as well as large bundles should be achieved with a single winding of the string without a special adjustment of the machine being necessary. The use of cheap, ordinary commercial string or other tying media for tying also should be possible, a large number of tying operations to the minute should be effected; the connection of the ends of the string should be such that they cannot be easily undone; and the tying should be such that the bundles cannot become loosened during further handling and transportation. Finally the machine should be easily operated, even by the most unskilled people, and simple and solid in construction, whereby a wrong manipulation is automatically prevented.

One feature of the invention resides in the provision of a member in the form of a tying ring, rotating intermittently in one direction, which member holds the ends of the string, cord, wire or other tying media by means of a clamping device mounted on the ring which pulls the string around the articles to be tied, whereby said string is placed firstly around the bundle with a preliminary tension. However, continued rotation of the ring causes the string to be tightly stretched towards the end of the wrapping. The end of the string or the like is held by a movable support and is gripped and removed from the support by a cam-actuated clamping device carried by the ring as the ring rotates, and causes the string or the like to be wrapped around the bundle or object under tension. At the finish of the wrapping the ring is arrested and holds the string under tension. Then, during the last part of the revolution of the driving cam shaft the two adjacent parts of the string, which have been brought together in overlapping position, are firmly connected together by a clip, after which the string is cut behind this clip and the original end detached from the tying ring, so that the tied bundle or object can be removed.

In providing a machine of this character, the mechanical tying is made as similar as possible to the method of tying by hand; the string is wrapped around the bundle under a tension that can be regulated and which is of such degree, that damage or cutting of the objects is prevented. Indeed, a tight stretching of the string only takes place just before the moment of interruption of the rotation and after the support is turned to such a position that it seizes and firmly holds the passing string. Thus a thorough tightness of the string around the bundle is ensured without a special tension means being required; the slack in the string is fully taken up when being stretched later on.

By providing more than one clamping device on the tying ring, which devices operate alternatively, it is possible to increase highly the effective working of the ring.

The new improved machine, being of very simple construction and rapid operation, is capable of using not only string or rope of cheaper or better quality, but also ribbon, metallic wire, cord or the like. The number of tying operations to the minute can be increased so that a high rapidity of bundling is obtained. At the same time the consumption of string or the like is reduced to a minimum.

The invention comprises further features in the construction, arrangement and combination of parts, as will be hereinafter set forth and more particularly pointed out in the claims.

A constructional embodiment of the invention is illustrated in the accompanying drawings, in which similar reference characters represent corresponding parts in all the views.

Fig. 17 is a bottom plan view of the machine; and

Figure 3:
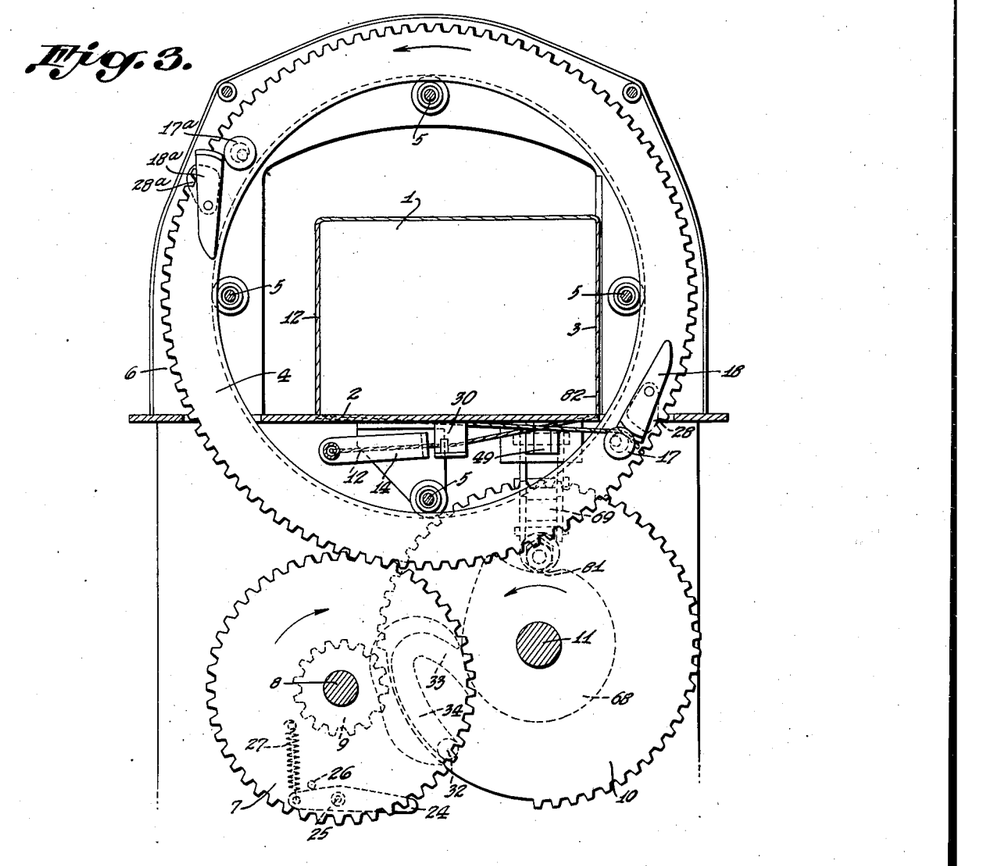
Fig. 3 is a vertical section along the line III—III of Fig. 1.

Referring to the drawings the bundle 1 to be tied is placed on the horizontal table 2 within the ring 4 against the vertical wall 3 (Fig. 3). The ring 4 is guided by four roller bearings 5 journalled on fixed axes and engaging in an annular groove formed in the inner periphery of the ring. The ring rotates in one direction in a vertical plane at right angles to the wall 3 and the portion of the ring above the table is enclosed in a guard casing 6 to protect the operator from injury from the revolving ring. The outer peripheral edge of the ring is toothed and for driving purposes meshes with a pinion wheel 7 which is fixed on an intermediate shaft 8. The shaft 8 carries a pinion wheel 9 which meshes with toothed wheel 10 fixed on the cam shaft 11.

Figure 7:
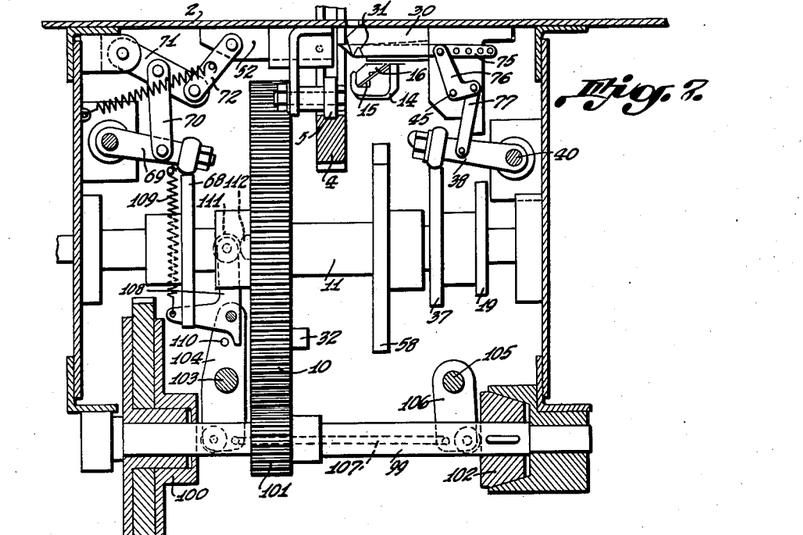
Fig. 7 is a vertical section along the line VII—VII of Fig. 1.
Figure 8:
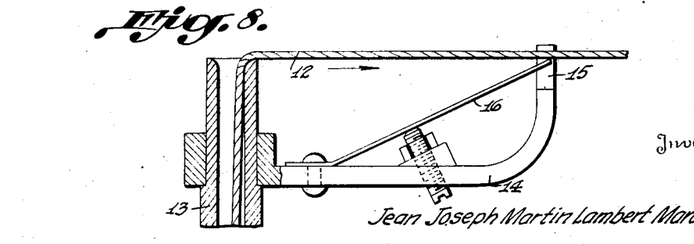
Fig. 8 is a detail of a support for the string having a spring for holding and tightening the same.

The end of the string 12, which comes from a bobbin (not shown) and passes through the hollow shaft 13, is held by the supporting arm 14 fixed on said shaft 13 and provided for this purpose with a groove 15, into which groove a blade spring 16 projects to engage the string with a certain amount of resilient pressure which is adjustable (see Figs. 4, 5, 7 and 8). The spring 16 is so formed and attached to the support, that the string can slide in the direction of its feed but its movement in the reverse direction is prevented. The pressure is variable by a set-screw (Fig. 8).

The ring 4 is provided with one or more clamping devices for the string, each comprising a conically headed bolt 17 and a friction catch 18. The conical head is arranged eccentrically on the bolt to permit regulation of the tension by adjusting the angular position of the bolt to different position. The catch 18 can turn about a spindle provided on the ring 4 or preferably the spindle is fixed to the catch and rotatably mounted in the ring 4. In Fig. 3 two catches 18—18a are shown in different positions. The end of the catch 18 which is turned to the bolt 17 is eccentric with regard to the axis of rotation of the catch, so that the space between that end and the head of the bolt 17 becomes less when that end is displaced on the ring in an inward direction towards the axis of the ring.

The clamping devices 17—18 and 17a—18a provided on the ring operate alternately and thus the angular travel of the ring 4 necessary for a complete tying operation is reduced.

Figure 5:
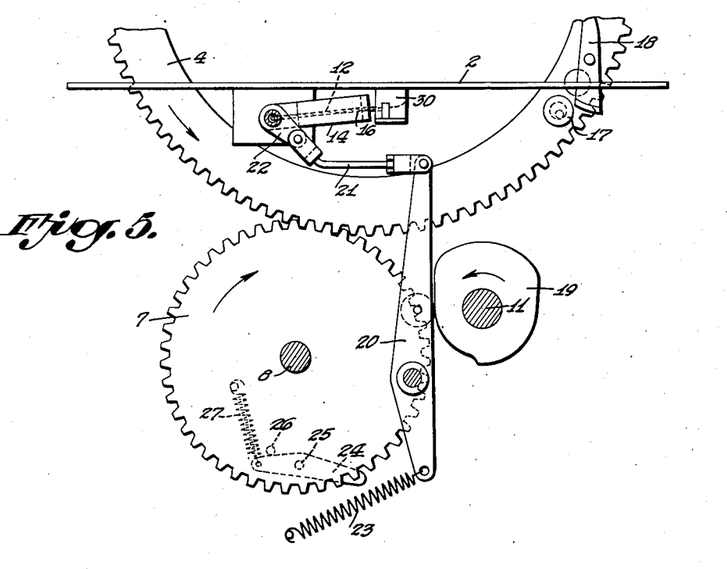
Figs. 5 and 5a are vertical sections along the line V—V of Fig. 4 showing parts of the machine in different positions assumed during the operation of the machine.
Figure 5A:
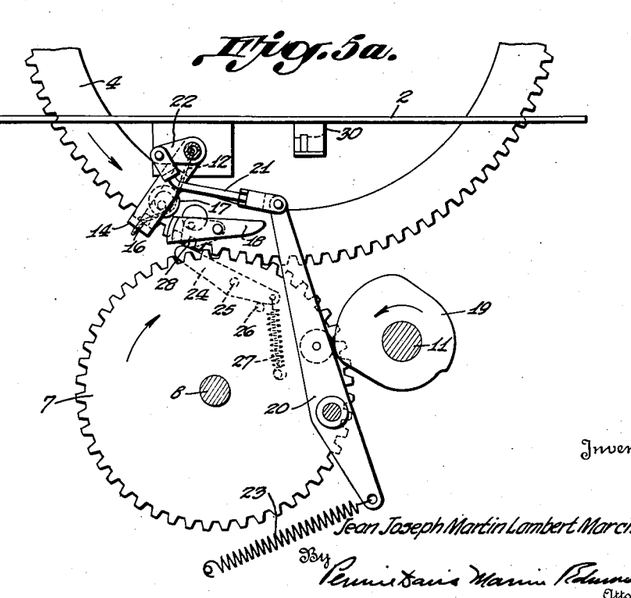

At the end of each wrapping operation the support 14 is in a nearly horizontal position, as shown in Fig. 5, and holds the end of the string ready for the next wrapping operation, when a bundle is set upon a table and the machine set in motion. At the commencement of the rotation of the ring 4 in the direction of the arrow, the cam 19 on the shaft 11 sets the support in its lower position, shown in Fig. 5a, by means of the lever 20, the rod 21 and the crank 22, which crank is fixed on the hollow shaft 13 together with the support 14. The lever 20 is spring-loaded by spring 23 which enables the lever to follow the movement of the cam 19.

When the support 14 is in its lower position the string is situated in the path of the conical head of the bolt 17 of the clamping device 17—18 or 17a—18a of the ring 4 and on further rotation the head then passing can seize the end of the string and carry it off. The end of the string held in the support 14 by the blade spring 16 is pulled due to the conicity of the head of the bolt 17 into the space between this head and the lower end of the catch 18, this end still being separated sufficiently from the head of the bolt in this position and further by the rotation of the ring 4 and of the wheel 7 the friction catch 18 is moved towards the head of the bolt 17 by the lever 24 (Fig. 5), which can oscillate about the axis 25 fixed to the wheel 7. Lever 24 is loaded with a spring 27 and in the rest position engages with a stop 26 also fixed to the wheel 7. The free end of the lever 24 exerts a pressure on the cam plate 28 which is connected to the catch 18 in such a manner that the string is gripped between the catch and the head of the bolt. In the continuation of movement of the ring 4 the string will be retracted from the support 14 in an upward direction and towards the ring 4, to the left in Fig. 7, so that the string then is connected to the ring only. By a proper eccentricity of the head of the bolt 17 or 17a, the latter can be fixed on the ring 4 in a position with respect to the end of the catch, such that the desired holding on the end of the string is obtained. When desired the lever 24 can exert its pressure also directly on the end of the catch 18.

In the continuation of movement of the ring 4 the string passing from the hollow shaft 13 is drawn around the bundle, whereby it is led into a slot 29 of the table 2. The string is now held in such a manner that another clamping device also located on the ring, can pass freely without seizing the string. The string slides in a groove 31 of the fixed guide member 30, this groove being in the path of the string (see also Fig. 7).

In the further rotation of the ring 4 just before the clamping device 17—18 or 17a—18a passes the support 14 for the second time, this support is returned to its substantially horizontal position. When the support is in its horizontal position it is in front of the groove 31 in the member 30 so that the end of the string held by the clamping device on the ring 4 will slide around the rounded lower surface, Fig. 7, of the support 14 and will not enter the groove 31 the second time. For this reason the end of the string held in the clamping device 17—18 or 17a—18a cannot be touched later on by the cutting device.

On the completion of the travel of the ring 4, the support 14 is turned a small additional amount in the vertical direction due to the shape of the cam 19 and by the tension of the spring 23 which loads the lever 20. At this upward movement the support with the groove 15 seizes the part of the string passing from the hollow shaft 13 and holds it under friction such that it is clamped and tightly stretched around the bundle. To ensure an easy introduction of the string into the support both the side of the blade spring 16 turned to the string and the end of the support 14 have upwardly diverging sides.

After the tying ring has made a sufficient travel for a complete tying operation, the ring is maintained in a stationary final position, in which the string remains stretched. During further rotation of the cam shaft and the toothed wheel 10, whilst the ring is arrested, means come into operation for cutting off a preferably metal clip and for connecting the overlapping parts of it to the string.

Figure 2:
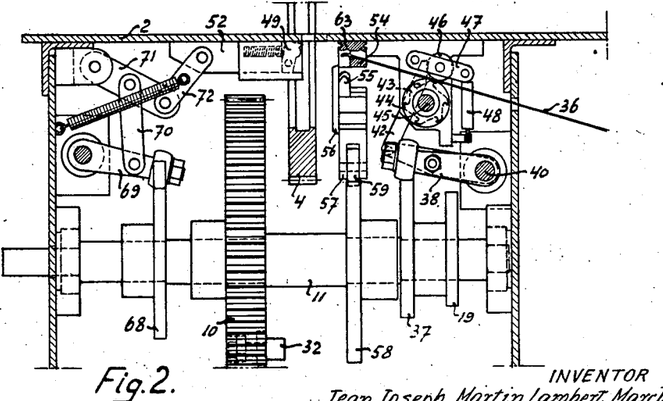
Fig. 2 is a vertical section along the line II—II of Fig. 1.
Figure 2A:
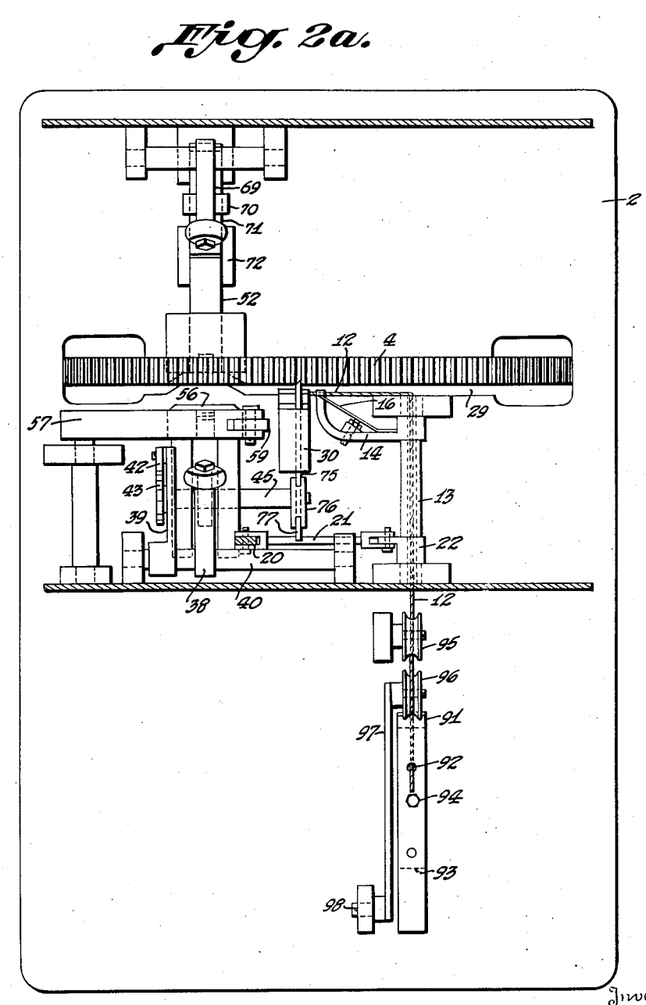
Figure 2a is a horizontal view, looking upward at the bottom of Fig. 2.

In order to hold the toothed wheel 7 and consequently the tying ring 4 in stationary postion, the teeth of the wheel 10 are omitted from a part of its periphery; moreover this wheel carries a bolt 32, with the head projecting from the side of the wheel towards the wheel 7 (see Figs. 2 and 7). This projecting head of the bolt can slide in the guide channel 33, 34 formed by projections on the side of the wheel 7 in the direction towards the wheel 10 or by members fixed to the wheel for the same purpose. Guide channel 33, 34 is provided in such manner and has a suitable curvature so that in the rotation of the wheels, towards the end of the meshing of the toothed portion of the wheel 10 with pinion 9, the head of the bolt 32 first enters the beginning part 33 of the guide channel so that a uniformly retarded motion is obtained and after that, when the toothed portion of wheel 10 moves out of mesh with pinion 9, the bolt 32 enters the last part 34 of the guide channel, which part is concentric about the axis of the wheel 10. Having arrived in the concentric channel 34 of the guide, the bolt 32, although continuing its movement with the wheel 10, prevents the rotation of the wheel 7 and consequently that of the ring 4 in such a manner that the string is no longer displaced but remains tensioned so that the clip can connect the parts of the string which are brought together.

It is obvious that the ratio of the pinion wheels is chosen such, that during a complete revolution of the cam shaft 11 and pinion wheel 10, the ring 4 first completes one turn of the string around the bundle on table 2 and then remains stationary, whilst the wheel 10 completes the last part of its revolution.

The connecting clips may be cut from a metallic band 36 (Fig. 2) which is advanced in intermittent steps of movement of disc 44 which is rotated through the cam 37 on the shaft 11 by means of levers 38 and 39, which both are pivoted on the fixed axis 40 and connected together by the bolt 41 (see also Figs. 4 and 7), and further by pawl 42 and the ratchet wheel 43 which together with the disc 44 are fixed to the pivotal shaft 45. A roller 46 carried by a double lever 47 one end of which is pivoted to a fixed part of the structure, presses by means of spring 48 the metallic band on to the disc 44. The intermittent movement of the band is made during the commencement of the movement of the ring 4 and in such a manner that the free end of the band just abuts against the head 49 of the sliding matrix 52, before which the string passes in such a manner that the latter is positioned under the projecting end of the band (see also Figs. 9–12) the band is guided in its movement by the groove 53 of the guide plate 54 (Fig. 2).

The rotation of the ratchet wheel 43 and the diameter of the disc 44 are so chosen that the disc at the last part of its movement turns each time slightly more than is sufficient for advancing the band so that it slides against the band with the object of ensuring that the end of the latter presses against the head 49 of the matrix 52.

Figure 11:
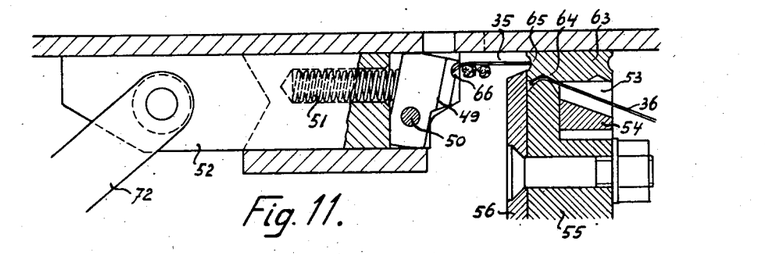

On a lifter 55 which is fixed on the lever 57 (see also Fig. 6) the knife 56 is provided, which after the metallic band has moved forward and about the end of the string, is lifted upwardly due to the rise 61 of the cam 58, moving beneath the roller 59 of lever 57 which is loaded by the spring 60, and lifts the lever 57 so that the knife 56 in combination with the fixed cutter block 63 cuts off a length of band to form the clip 35. Meanwhile the lifter 55 preforms the next clip by pressing the new end of the band 36 into the groove 64 of the cutter block 63 which is also arranged to act as a femal die block for this purpose (Fig. 11). The knife 56 can be turned on its fixing bolt to enable a new portion of its circumference to be used when the working edge is blunted. The combined cutter and die block 63 is of symmetrical form to enable both sides to be used alternatively for the same purpose.

After the clip has been cut from the band 36 it is held in position by engaging in the hollow groove 65 of the block 63 and groove 66 of the head 49 of the matrix 52 (Figs. 9–12). The head 49 is oscillably mounted on pin 50 to the matrix 52 so as to rock relatively to the matrix-body and is pressed forward by a spring 51. Further the slides 67 of the matrix between which the head 49 is guided are longer than the head is wide so that the sides extend beyond the head in the form of guides to prevent the clip from displacement in the direction of movement of the string.

Figure 1:
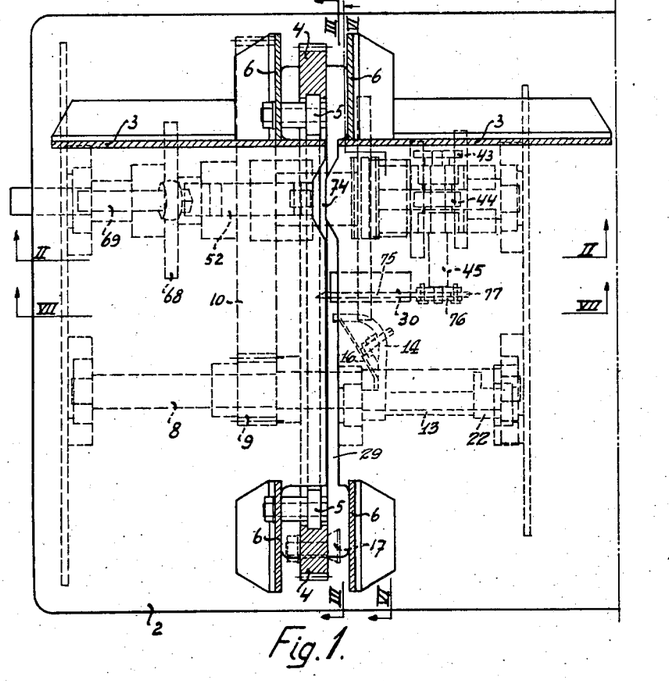
Fig. 1 is a plan view of the machine with certain parts omitted.
Figure 4:
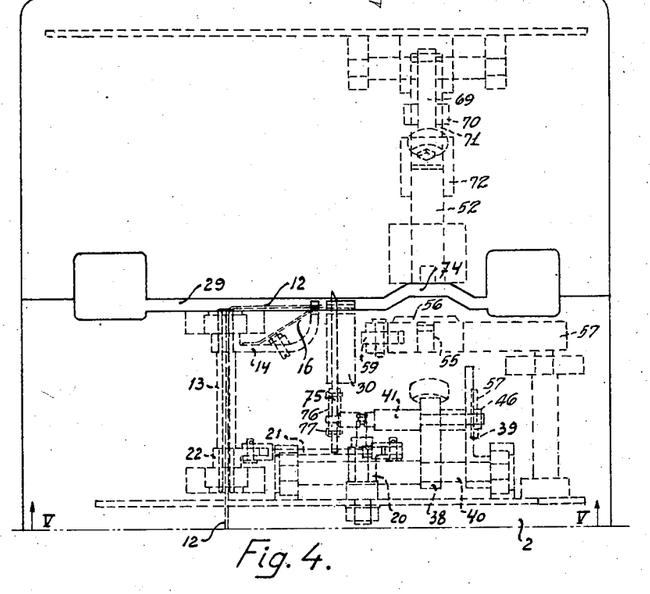
Fig. 4 is a plan view of the bundle supporting table of the machine showing certain mechanical parts which are omitted from Fig. 1.
Figure 12:
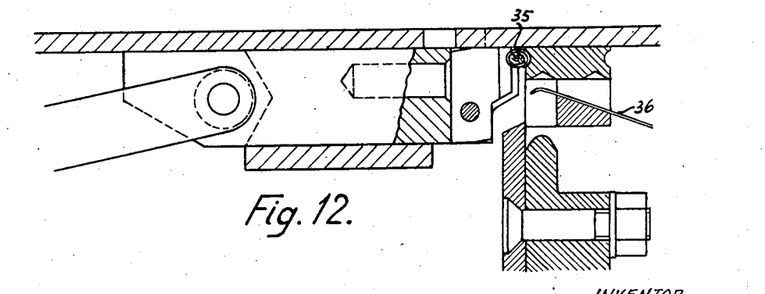

Due to the movement of the matrix 52 with its head 49 towards the block 63, which movement is determined by the cam 68 in co-operation with the system of levers 69, 70, 71 and 72, the clip is rolled up towards the end of the rotation of the shaft 11, thus forming a sleeve around the two parts of the string and giving the shape indicated in Fig. 12, the sleeve being flattened slightly with the result that the two parts of the string are very firmly gripped therebetween and connected together. In the formation of this sleeve it abuts against the lower surface of the table on which the bundle is placed in such a manner that it cannot bend in an upward direction. Therefore the groove 29 in the table is not wholly rectilinear but is offset at 74 (Figs. 1 and 4). The string encircling the bundle lies in a vertical plane passing through to the straight parts of the groove 29 and under the clip and the projecting part of the right half of the table indicated in Fig. 1. The string thus has twice passed the clip, the first time at the beginning of the movement of the ring 4 and finally after having encircled the bundle by one turn towards the ends of the movement of the ring.

After the two parts of the string have been securely connected together by the clip, the part being the original end of the string, held by the ring, having slid away from the outer surface of the support 14 and so not being located in the groove 15 of the support 14 nor in the groove 31 of the guide 30, whilst the part of the string, leading to the bobbin, is in the two grooves 15 and 31 (Fig. 7), this latter part of the string is severed just after the clip by the knife 75. The string thereby is held in the groove 31 of the guide 30. The knife 75 that slides in the guide 30 is moved towards the left (Fig. 7) by the bell crank lever 76, which is freely rotatable on the extremity of the shaft 45, the latter carrying the ratchet-wheel 43 and the disc 44, and is rocked by a rod 77 attached to the end of the bolt 41 connecting the levers 38 and 39, these two levers being moved in a vertical direction by the rise on the cam 37. During the movement of the levers the pawl 42 is also displaced in a vertical direction to step the ratchet-wheel 43 around by one tooth and advance the band 36 when the machine is again set in operation. The knife 75 is made longer than is necessary and its end which is connected to the lever 76 is provided with a number of holes for the connecting pin of this lever, in order to make it possible to employ this knife again when it has been shortened by sharpening.

The original end of the string is now still held by one of the clamping devices 17—18 or 17a—18a of the ring 4. During the last part of the revolution of the cam shaft 11 the roller 59 of the lever 57, however, passes into a notch 78 of the cam 58 (Fig. 6) by which movement a pin 79 on an extension 80 of the lever 57 engages with the free end of the friction-catch 18 or 18a holding the original end of the string, with the result that the catch is displaced from the head of the bolt 17 or 17a and the end of the string is freed to enable the bundle or tied object to be removed.

Figure 9:
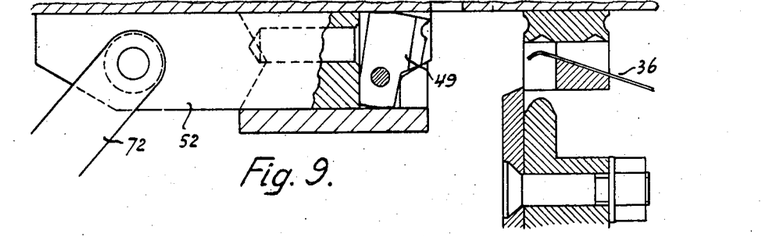
Figs. 9–12 are details drawn to a larger scale of the arrangement for making a clip used for uniting the ends of the string.
Figure 10:
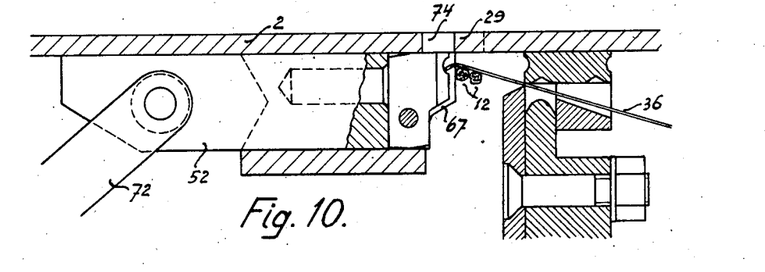

At this point of the operative cycle the roller of the lever 69 (Figs. 2 and 3) is positioned in a depression 81 on the cam 68 immediately behind the projection on this cam and consequently the matrix 52 with its head 49 is in its extreme left-hand position (Fig. 9). Thus the slot in the table to the right of the offset portion 74 is opened sufficiently to allow the string together with the clip to pass therethrough when the tied object is removed. When, later, the machine is again set in motion, to effect a fresh tying operation, the roller on the lever 69 (Figs. 2 and 3) directly comes in a position just at the beginning of the concentric circumference of the cam 68 and the matrix 52 takes up the position shown in Fig. 10. The roller 59 of the lever 57 (Fig. 6) thereby takes up a position on the concentric peripheral edge of the cam 58 such that the pin 79 is disengaged from the catch 18 and the ring 4 can turn freely.

Fig. 7 shows an arrangement which causes the stopping of the tying machine when being mechanically driven e. g. by means of an electric motor, at the right moment of the operation, in such manner that all parts at every turn come in the proper position for a new tying operation.

The electric motor (not shown) drives the shaft 99 rotatably mounted in fixed bearings of the structure and through the intermediary of a friction-clutch 100 provided at one end of the shaft. A pinion wheel 101 is fixed on the shaft 99, driving in turn the cam-shaft 11 of the tying machine, when the clutch 100 is thrown in. At the other end of shaft 99 a conical brake-pulley 102 is provided, rotating with the shaft and at the same time slidable in axial direction. Brake-pulley 102 and clutch 100 are mutually connected by means of a lever-system comprising a lever 104 pivoted to a fixed point 103 and connected to the movable part of the friction-clutch and a lever 106 pivoted to a fixed point 105 and engaging with the brake-pulley 102; both levers are firmly connected by a rod 107.

At the free end of the lever 104 a toggle-joint lever 108 is hinged and, normally, abuts against a stop 110 on lever 104 by means of a spring 109 connected to one arm of the lever 108, the other arm carrying at its end a roller 111. This roller is positioned in the path of travel of a cam 112 provided on the toothed wheel 10 of the cam shaft 11.

In operation of the tying machine the cam 112 is freed from the roller 111 and thus does not bear against it. Under action of spring 109 the lever 108 bears against the stop 110 and the levers 108, 104 now as a whole are held in a position in which the friction-clutch 100 is thrown in, while the brake-pulley 102 is disengaged. At such moment of the operation, however, when the machine must be stopped, the cam 112 pushes against the roller 111 thus moving lever 108 in spite of the load of spring 109 away from the stop 110 and in further continuation of the movement the lever system 104, 106 and 107 comes into a position in which brake-pulley 102 is thrown in and at the same time the movable part of friction-clutch 100 is thrown out.

Figures 6, 13, 14, 15:
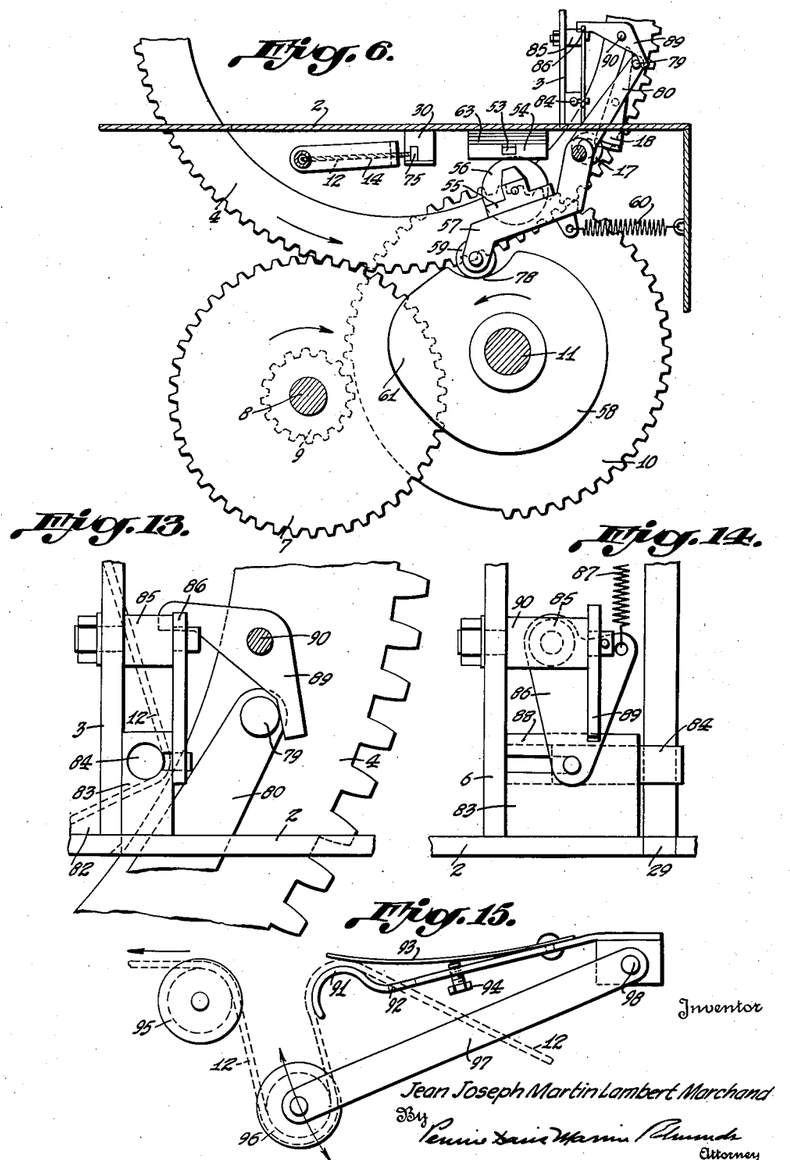
Fig. 6 is a vertical section along the line VI—VI of Fig. 1.
Figs. 13 and 14 are details of a guiding-device for the string.
Figs. 15 and 16 are details of an arrangement for feeding and supporting the string.

Figs. 13 and 14 show an arrangement for guiding the string, at the commencement of the winding operation, around the corner 82 (Fig. 3) of the bundle in order that the string may not be carried unduly in a vertical direction and so caused to move the bundle from its position against the wall 3. To this end, a pin 84 slides in a guiding member 83 fixed to the vertical wall 3 of the table. This pin is moved by the lever 86 which pivots about the fixed axis 85 and which is loaded by a spring 87. The length of the slat 88 in the member 83 limits the displacement of the pin 84 towards the right (Fig. 14) and the pin is held in the position of Fig. 14 during the commencement of the movement of the string. The pin is then in the vertical plane of the slot 29 of the table and the string is thus guided around the corner 82 by the pin. Before the winding of the string is terminated, the lever 57 is moved upwards as already explained and in consequence the extension 80 of this lever is displaced towards the right (Figs. 6 and 13). The pin 79 on this projection 80 displaces the lower vertical arm of the lever 86, which lever pivots about an axis 90 fixed to the cover 6 towards the right and thus the horizontal arm of the lever 89 which rests on the lever 86 is moved in a downward direction. Consequently, the pin 84 is displaced towards the left (Fig. 14) and the string is freed to enable it to be drawn around the bundle during the continued rotation of the ring 4.

At the beginning of the winding, the string is extended to a certain length by the ring 4. In order to prevent undue slack in the string e. g. when tying bundles or objects of very small dimensions, a take-up arrangement as shown in Fig. 15 can be provided in the path of the string before the latter passes through the hollow shaft 13. The string 12 coming from the bobbin is guided by a fixed guide 91 which is provided at its end with an aperture 92 extending across approximately half the width of the guide. The string is resiliently pressed between the guide and a blade-spring 93, the tension of which may be regulated by a screw 94, and it then passes round two pulleys 96 and 95. The pulley 95 is rotatably fixed to the table, while the pulley 96 is rotatably mounted at the end of the lever 97 which pivots about a fixed point 98 and is loaded by a spring or a weight (not shown) which tends to move the lever in a downward direction.

During the winding of the string around the bundle the string at the commencement is taut and holds the pulley 96 in its upper position, but if the bundle or the object to be tied is very small the string slackens and the slack is taken up in further rotation of the ring 4, by the pulley 96 now moving downwards before the support 14 (Fig. 5) seizes it. Due to the position of the spring 16 after cutting the string, the tying operation having been completed, this string cannot be withdrawn through the support 14 by device shown in Fig. 15.

Figure 16:
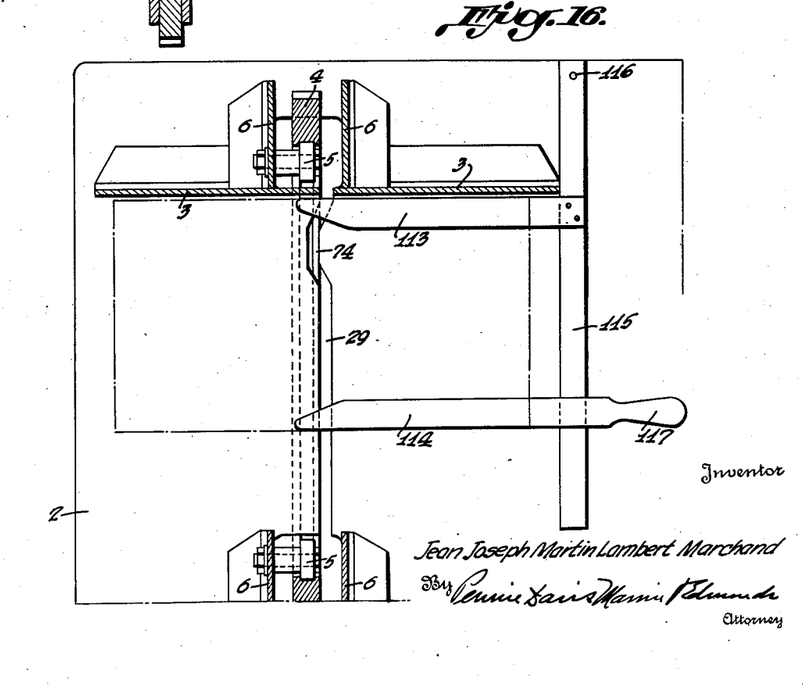
Figure 18:
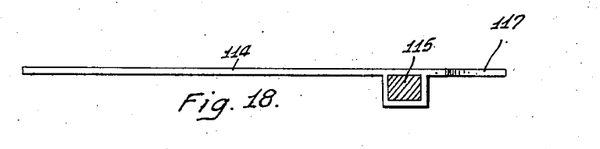
Fig. 18 is a detail view, partly in section, showing the movable guide for the packages to be tied in elevation.

Thus in this case also the string is sufficiently tightly stretched around the bundle in the manner as described and so the machine is suitable for tying in like manner bundles or objects of very small dimensions and even when necessary bundles of very small height viz. comprising only a few documents, letters or the like. To prevent in that case a curling up of the edges of said objects when wrapping the string around, a device can be provided as shown in Fig. 16.

Said device consists in a double guide, comprising a fixed guide formed as a flat arm 113 and a correspondingly formed movable guide 114. The arm 113 is fixed to a flat rod 115 at right angles there-to, either loosely mounted at 116 on the table 2 or pivoted at that point in such a manner that the rod 115 and arm 113 and movable guide 114 carried thereby can be dispensed with or moved away when not in use. The arm 114 slides along rod 115 and can be provided with a handle 117 for that purpose.

When in use the rod 115 is adjusted in a position that the fixed arm 113 with its outer edge is situated along the vertical wall 3 of the table 2 thus coinciding with that edge just in the plane of the upstanding side of the bundle to be tied and placed against said wall. The arm 114 is adjusted on the rod 115 by means of the handle 117 so that it coincides with its outer edge in the plane of the outer upstanding side of the bundle. The lower surface of both arms is separated a small distance from the upper side of the table, said arms projecting just beyond the slot 29 of the table 2, and having their ends rounded off as illustrated in the drawing. Now when wrapping the string around the bundle, the said string is held by the outer edges of arms 113 and 114 and thus the tension of the string is fully taken up by said arms. Before removing the bundle or tied object the arm 114 must be displaced inwardly to a small degree.

While the design and construction of the bundle tying machine has been described and illustrated only by way of example, it is obvious that the invention may be susceptible of changes and the right of these changes is claimed, provided they are comprehended within the scope of what is claimed. Thus another embodiment of the invention may be such that more than one metal clip simultaneously are formed and cut off, thus enabling the overlapping parts of the string to be connected at different points. Likewise two tying rings may be provided each with their own clamping devices thus enabling the tying of bundles of great length at more than one place.

Having thus described my invention what I claim as new and desire to secure by Letters Patent is:

1. A machine for tying a bundle of letters, books or like documents or for binding other objects with a string or the like, comprising a tying ring rotatable in one direction only during a tying operation, clamping means carried by said ring for holding the end of the string and adapted, as the ring rotates, to pull the string around the article to be tied, means for arresting the rotation of the ring after the string has been carried entirely around the article, and means, including said clamping means, for increasing the tension on the string just prior to the arrestment of the rotation of the ring and for maintaining the string under tension and in overlapped relation after the rotation of the ring has been arrested, and means for connecting the adjacent overlapping parts of the string.

2. A machine for tying a bundle of letters, books or like documents or for binding other objects with a string or the like, comprising a rotatable tying ring, clamping means carried by said ring, a cam shaft, means operated by said cam shaft for causing the clamping means to seize the end of the string at the beginning of the rotation of said ring, said clamping means, as the ring rotates, carrying the string around the article to be tied, means for arresting the rotation of the ring after the string has been carried entirely around the article, means in addition to said clamping means and cooperating therewith for maintaining the string under tension and in overlapped relation after the rotation of the ring has been arrested, means for applying a connecting clip to the overlapping ends of the string, means for cutting the string behind the clip, and means operated by said cam shaft for releasing the original end of the string from the clamping means.

3. A machine for tying a bundle of letters, books or like documents or for binding other objects with a string or the like, comprising a rotatable tying ring, a support for normally holding the end of the string in an initial position, means carried by the tying ring for gripping the end of the string from said initial position and carrying it at least part way around the article to be tied with a preliminary tension, means operable just prior to the finish of the tying operation to cause said support to again seize the string beyond the point where the string subsequently is to be secured and to hold it under friction sufficient that on further rotation of the ring the string will be stretched taut, means for securing the string which has been wrapped around the article, means for severing the string after it has been secured, and means for causing the support to return the new end of the string to said initial position.

4. A machine for tying a bundle of letters, books or like documents or for binding other objects with a string or the like, comprising a rotatable tying ring, a plurality of clamping means carried by said ring, means for operating said clamping means to alternately grip the string and carry it around the article to be tied, each clamping means comprising a pivoted member having an eccentric gripping surface and a cooperating tapered stud, said pivoted member being movable towards the tapered stud to grip the string and fix it between said pivoted member and the stud.

5. A machine for tying a bundle of letters, books or like documents or for binding other objects with a string or the like, comprising a rotatable tying ring, a plurality of driving gears including a pinion for said ring, clamping means carried by said ring for gripping and carrying a string around an article to be tied, one of said driving gears for the tying ring meshing with said pinion and having the teeth omitted from a part of its periphery, said gear also having a projection extending from one side thereof into a guide channel formed in another of said gears, said guide channel having a curvature such that during the rotation of the gears the projection enters the beginning part of said channel as soon as said first-mentioned gear reaches a position in which the teeth thereof are not in mesh with the pinion, to produce a uniformly retarded motion and thereafter the projection passes into the last part of said channel to arrest the rotation of the tying ring.

6. A machine for tying a bundle of letters, books or like documents or for binding other objects with a string or the like, comprising a rotatable tying ring for carrying the string around an object to be tied and for overlapping portions of the string, means for advancing a metallic band in intermittent steps during the first part of the rotation of said ring, and means operable during the last part of the rotation of the ring for severing the end of said metal band and securing the severed portion around the overlapping portions of the string and simultaneously preforming the new end of the metal band.

7. A machine for tying a bundle of letters, books or like documents or for binding other objects with a string or the like, comprising a table upon which the article to be tied is adapted to rest, a rotatable tying ring for carrying the string around the article to be tied, said table having a slot in which the tying ring rotates, and means beneath the table for applying a clip around the string after it has been wrapped around the article, said slot having an offset portion forming a projection in the table surface substantially in the plane of rotation of the ring which serves as an anvil in the application of a clip around the string.

8. A machine for tying a bundle of letters, books or like documents or for binding other objects with a string or the like, comprising a table for supporting an article to be tied, means for passing a string around the article to be tied, a flangeless, flat guide adapted to be positioned upon said table under articles to be tied in a fixed position with respect to articles to be tied and maintained in that position during an entire tying operation, a guide member, a guide movable along said guide member and adjustable over the surface of the table, the respective outer edges of said fixed and adjustable guides being adapted to coincide with the vertical planes of opposite edges of the articles about which the string is to be passed whereby the tension of the string during the wrapping operation is taken up by the edges of said guides.

9. A machine for tying bundles of letters, books or like documents or for binding other objects with a string or the like, comprising a tying ring rotatable in one direction, means for gripping the string just prior to the beginning of a tying operation, string clamping means carried by said ring for holding the end of the string and adapted as the ring rotates to pull the string around the article to be tied, means for causing said gripping means to release the string after the string has been clamped by the clamping means carried by the ring, means for arresting the rotation of the ring after the string has been carried entirely around the article, means for causing said gripping means to again grip the string just prior to the arrestment of the rotation of the ring, said gripping means and said clamping means maintaining the string under tension and in overlapped relation after the rotation of the ring has been arrested, and means for connecting the adjacent overlapping parts of the string.

JEAN JOSEPH MARTIN LAMBERT
MARCHAND.